United States Patent Office 2,822,365
Patented Feb. 4, 1958

2,822,365

PROCAINE-8-CHLOROTHEOPHYLLINATE AND PROCESSES FOR PREPARING IT

Werner Storbeck, Frankfurt am Main, Germany, assignor to Frankfurter Arzneimittelfabrik G. m. b. H., Frankfurt am Main, Germany, a corporation of Germany No Drawing. Application July 19, 1954
Serial No. 444,350

5 Claims. (Cl. 260—253)

This invention relates to procaine-8-chlorotheophyllinate and processes for preparing it.

It has been found that, by reacting 8-chlorotheophylline with p-aminobenzoyldiethylaminoethanol (procaine base) a new compound of the following formula

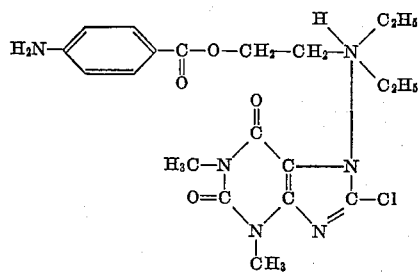

is formed, which is distinguished by a local anesthetizing effect considerably higher than that of the p-aminobenzoyldiethylaminoethanol used as starting material. The effect of the new compound, i. e. the analgesia, sets in with greater speed. When compared with the amino base, its analgesic range achieved with an equal portion of the base, is many times greater. For example, a subcutaneous injection of 20 mg. of the new compound results in a surface effect on the skin covering a region 15 to 20 times larger than that obtained by the use of the corresponding amount of p-aminobenzoyldiethylaminoethanol hydrochloride. The expansion of the analgesic region continues even after the lapse of 25 to 40 minutes, while, when using p-aminobenzoyldiethylaminoethanol hydrochloride containing the same amount of base, the borders of the analgesic region do not change any more after the lapse of 15 minutes subsequent to injection. Furthermore, the local anesthetic effect lasts considerably longer. It is of special interest that the segments of the skin which are located within the effective range of the drug show a clearly visible reddening which is caused by a local irritation and hyperaemia, the production of which is specially desired in some indications. In like manner as the analgesic effect the cutaneous reaction characterized by red pomphous spots covers a much larger region the extent of which depends on the site of the injection. The increased speed of penetration as well as the increased penetrating power of the new compound in living tissue, when compared with the hydrochloride of the amino base, are also accompanied by an increase of the toxicity by about 30%; however, this increase of toxicity is unimportant when related to the increase in the effectiveness of the base portion due to the formation of a salt with 8-chlorotheophylline.

The cleavability of the new compound by serum esterase is appreciably delayed when compared with procaine-hydrochloride. After the lapse of 30 minutes, 36% of the base remain as uncleaved ester, as compared with 5% of the base, if procaine hydrochloride is used. On account of its properties the new compound is specially well suited for use in healing anesthesia.

The conversion may be carried out in a suitable solvent, such as water, methyl alcohol, ethyl alcohol, ethyl acetate and acetone, and in mixtures of these solvents, preferably at somewhat elevated temperatures, and results in a stable compound which represents a salt of 8-chlorotheophylline and p-aminobenzoyldiethyl aminoethanol.

The new compound may be produced by various methods, for instance:

(1) From the free procaine base by reacting it with the calculated amount of 8-chlorotheophylline in water, methanol, ethanol, ethyl acetate, acetone or mixtures thereof. In view of the possibility of a transesterification, the heating in alcohols must not last too long. The reaction is advantageously conducted at a temperature in the range of 50 to 60° C.; however, it also takes place without applying heat. The direct yield of the product increases as its solubility in the corresponding solvent decreases according to the following series:

Water<methanol<ethanol<ethyl acetate<acetone

The best yields are obtained with acetone.

(2) As the free procaine base does not represent a storable compound, the technical process starts from the procaine hydrochloride. In view of the fact that the procaine base is easily cleaved in an alkaline medium into p-aminobenzoic acid and diethylaminoethanol, the setting free of the procaine base must be carried out very carefully. This may be accomplished by using the exact equivalents of caustic alkali or alkali carbonate at temperatures below about 20° C. A mixture of acetone with ethanol may be considered as being the most suitable solvent. Apart from the above named solvents, isopropanol may also be mentioned.

(3) The new compound may also be obtained by double decomposition between a salt of the procaine base and a salt of the 8-chlorotheophylline.

The most suitable temperatures of reaction are those corresponding to the boiling points of the respective solvents. Thus a thorough mixing of the substances to be reacted may be secured, which causes a high speed of reaction. However, since the reaction is a reaction of ions that proceeds with a relatively high speed, the temperature of the reaction mixture is not of decisive importance.

It was already known to react p-aminobenzoyldiethylaminoethanol with glutamic acid or with p-aminobenzoic acid to form the corresponding salts which possess an increased anesthetizing effect. However, the salt of glutamic acid is a difficultly crystallizing, hygroscopic compound, and also the salt of the p-aminobenzoic acid could be obtained in crystallized form only after keeping it for several days in a vacuum exsiccator, even if using absolute ethanol as a solvent. The new compound does not possess these shortcomings and may be readily obtained in crystalline form and analytically pure. Besides, when compared, for example, with procaine hydrochloride, the new compound possesses the advantage of more prolonged stability to the action of serum esterases.

*Examples:*

I.—27.2 g. (0.1 mol) p-aminobenzoyldiethylaminoethanol hydrochloride are suspended in 50 ccm. acetone in a wide-necked flask of 150 ccm. capacity.

4.0 g. sodium hydroxide are dissolved in 10 ccm. water and added thereto drop by drop while stirring. Subsequently 25 ccm. ethanol are added, and the mixture is vigorously agitated for 90 minutes. The clear colorless solution is separated with suction from the precipitated sodium chloride, and the filtrate is allowed to dry in the presence of 20 g. anhydrous sodium sulfate for 15 minutes. The cloudy liquid is filtered into a round flask of 300 ccm. capacity. The remaining sodium sulfate is dissolved in 200 ccm. of water, thus precipitating further 1.4 g. p-aminobenzoyldiethylaminoethanol base which have the melting point of 48 to 50° C.

These 1.4 g. are added to the alcohol-acetone filtrate, and 21.4 g. 8-chlorotheophylline (0.1 mol) are added to the nearly colorless solution. The mixture heats itself slightly. After thoroughly shaking, it is boiled with reflux for 30 minutes and filtered with suction while still hot. The filtrate is poured into a porcelain bowl. After standing for two hours, a white substance crystallizes which may be assisted by rubbing with a glass stick.

The crystals are filtered with suction and washed 3 times each with 10 ccm. of acetone. By drying in vacuo over caustic soda 27.0 g. of a white crystalline substance are obtained. From a second crystallization 13.8 g. are obtained.

The new compound forms colorless crystals having the melting point of 160 to 162° C. The compound is water-soluble. 1 g. of the new compound dissolves in 40 ccm. water at 20° C. The saturated solution has a pH-value of 6.8.

The new compound may preferably be recrystallized from aqueous acetone. 450 g. of the raw product after recrystallization from a mixture of 500 ccm. acetone and 75 ccm. water will yield 420 g. of the compound (93%). Without being dried in vacuo the purified compound had a melting point of 155–159° C. After drying it in a high vacuum at 50° C. it showed the following analytic data:

Formula: $C_{20}H_{27}O_4N_6Cl$ (449.91)

|  | C, percent | H, percent | N, percent |
|---|---|---|---|
| calculated | 53.38 | 6.04 | 18.68 |
| found | 53.67 | 6.11 | 18.52 |

II.—23.6 g. (0.1 mol) p-aminobenzoyldiethylaminoethanol are boiled with reflux in 90 ccm. ethanol with 21.4 g. 8-chlorotheophylline for 30 minutes. After cooling and standing for some time, 29.0 g. p-aminobenzoyldiethylaminoethanol-8-chlorotheophyllinate having a melting point of 160–162° C. are obtained by filtering with suction.

When concentrating the filtrate, an approximately quantitative yield is obtained.

III.—21.4 g. (0.1 mol) 8-chlorotheophylline are dissolved in a solution of 0.1 mol ammonia in 240 ccm. of water. 27.2 g. (0.1 mol) p-aminobenzoyldiethylaminoethanol hydrochloride are dissolved in 120 ccm. of water. Both solutions are slowly poured drop by drop upon 150 g. of ice contained in a vessel, while well stirring. After standing over night, about 30.0 g. of the desired substance in form of crystals separate from the clear solution, which yield corresponds to 66% of the theory. The substance after being completely dried melts at 160° C.

After filtering the mother liquor with carbon, it may be reused as solvent in the next batch, whereby the yield is rendered nearly quantitative.

IV.—23.6 g. (0.1 mol) p-aminobenzoyldiethylaminoethanol are boiled with reflux in 90 ccm. ethyl acetate with 21.4 g .(0.1 mol) 8-chlorotheophylline for 30 minutes. The mixture becomes solid. After filtering with suction 35.0 g. of the desired compound in fine colorless crystals which have a melting point of 160–162° C. are obtained.

The portion missing from the nearly quantitative yield may be obtained by concentrating the solvent. The theoretical yield is 45.0 g.

What is claimed is:

1. Procaine-8-chlorotheophyllinate having the following formula:

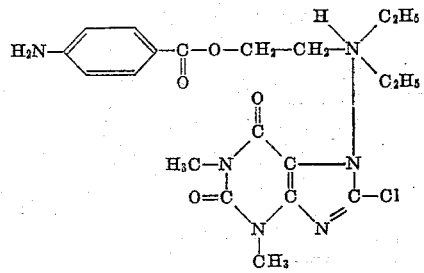

2. A process of preparing procaine-8-chlorotheophyllinate, which comprises reacting the basic component procaine and the acid component 8-chlorotheophylline to form a salt.

3. A process of preparing procaine-8-chlorotheophyllinate, which comprises reacting stoichiometric amounts of p-aminobenzoyldiethylaminoethanol with 8-chlorotheophylline in the presence of a solvent of the group consisting of water, methanol, ethanol, ethyl acetate, acetone and mixtures thereof.

4. A process of preparing procaine-8-chlorotheophyllinate, which comprises reacting stoichiometric amounts of p-aminobenzoyldiethylaminoethanol with 8-chlorotheophylline in the presence of a solvent mixture consisting of 2 parts of acetone and 1 part of ethanol at the boiling temperature of the solvent mixture, and recovering the desired product by crystallization.

5. A process of preparing procaine-8-chlorotheophyllinate which comprises reacting by double decomposition stoichiometric amounts of the ammonium salt of 8-chlorotheophylline with p-aminobenzoyldiethylaminoethanol hydrochloride in the presence of ice-water, and recovering the desired product by crystallization.

References Cited in the file of this patent

FOREIGN PATENTS

| 477,624 | Canada | Oct. 9, 1951 |
| 629,622 | Germany | May 8, 1936 |
| 800,413 | Germany | Nov. 6, 1950 |